United States Patent
Kalstiantz et al.

[11] Patent Number: 6,120,089
[45] Date of Patent: *Sep. 19, 2000

[54] TRUCK CAB SIDEWALL SKIN AND METHOD FOR MAKING THE SAME

[75] Inventors: Edmond Kalstiantz, Beaverton; James Edward Hill, West Linn, both of Oreg.; Homer Franklin Wright, Jr., Vancouver, Wash.

[73] Assignee: Freightliner Corporation, Portland, Oreg.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,297

[22] Filed: Oct. 24, 1996

[51] Int. Cl.$^7$ ....................................................... B60P 3/32
[52] U.S. Cl. ............... 296/183; 296/190.02; 296/190.08; 296/191
[58] Field of Search .................. 296/190.02, 190.08, 296/190.01, 183, 185, 191, 178, 180.1, 180.2

[56] References Cited

U.S. PATENT DOCUMENTS

| | | |
|---|---|---|
| 1,693,750 | 12/1928 | Groehn . |
| 1,855,747 | 4/1932 | Ledwinka . |
| 2,489,670 | 11/1949 | Powell, Jr. . |
| 2,600,140 | 6/1952 | Torseth . |
| 3,131,649 | 5/1964 | Eggert, Jr. . |
| 3,827,137 | 8/1974 | Schubach . |
| 4,311,744 | 1/1982 | Watanabe . |
| 4,775,179 | 10/1988 | Riggs ............... 296/190.02 X |
| 4,973,103 | 11/1990 | Imajyo et al. . |
| 4,978,163 | 12/1990 | Savio ................. 296/190.08 |
| 5,066,067 | 11/1991 | Ferdows . |
| 5,333,554 | 8/1994 | Yamada et al. . |
| 5,352,011 | 10/1994 | Kihara et al. . |
| 5,560,673 | 10/1996 | Angelo . |
| 5,769,486 | 6/1998 | Novoa et al. ......... 296/190.08 X |

FOREIGN PATENT DOCUMENTS

| | | | |
|---|---|---|---|
| 1501390 | 2/1978 | United Kingdom | ............. 296/190.08 |
| 1575001 | 9/1980 | United Kingdom | ............. 296/190.08 |

OTHER PUBLICATIONS

Freightliner Corporation brochure depicting a prior art FLD 112 truck.

*Primary Examiner*—Joseph D. Pape
*Attorney, Agent, or Firm*—Klarquist Sparkman Campbell Leigh & Whinston, LLP

[57] ABSTRACT

A truck cab sidewall assembly and method for making the same are disclosed. A sidewall skin is provided having a front edge, rear edge, top edge, and bottom edge, and a first exterior side and a second interior side. An inwardly directed front flange is provided along the front edge, and an inwardly directed flange is also provided along the top edge. The sidewall skin has a inwardly stepped transition region spaced rearwardly of the front edge. A rear corner is formed in the skin at a location forwardly of the rear edge and rearwardly of the transition region. A portion of the skin between the rear edge and rear corner forms part of the back wall of the truck cab. The rear corner is preferably formed by a roll forming technique. The transition region is preferably formed by a die-press.

22 Claims, 11 Drawing Sheets

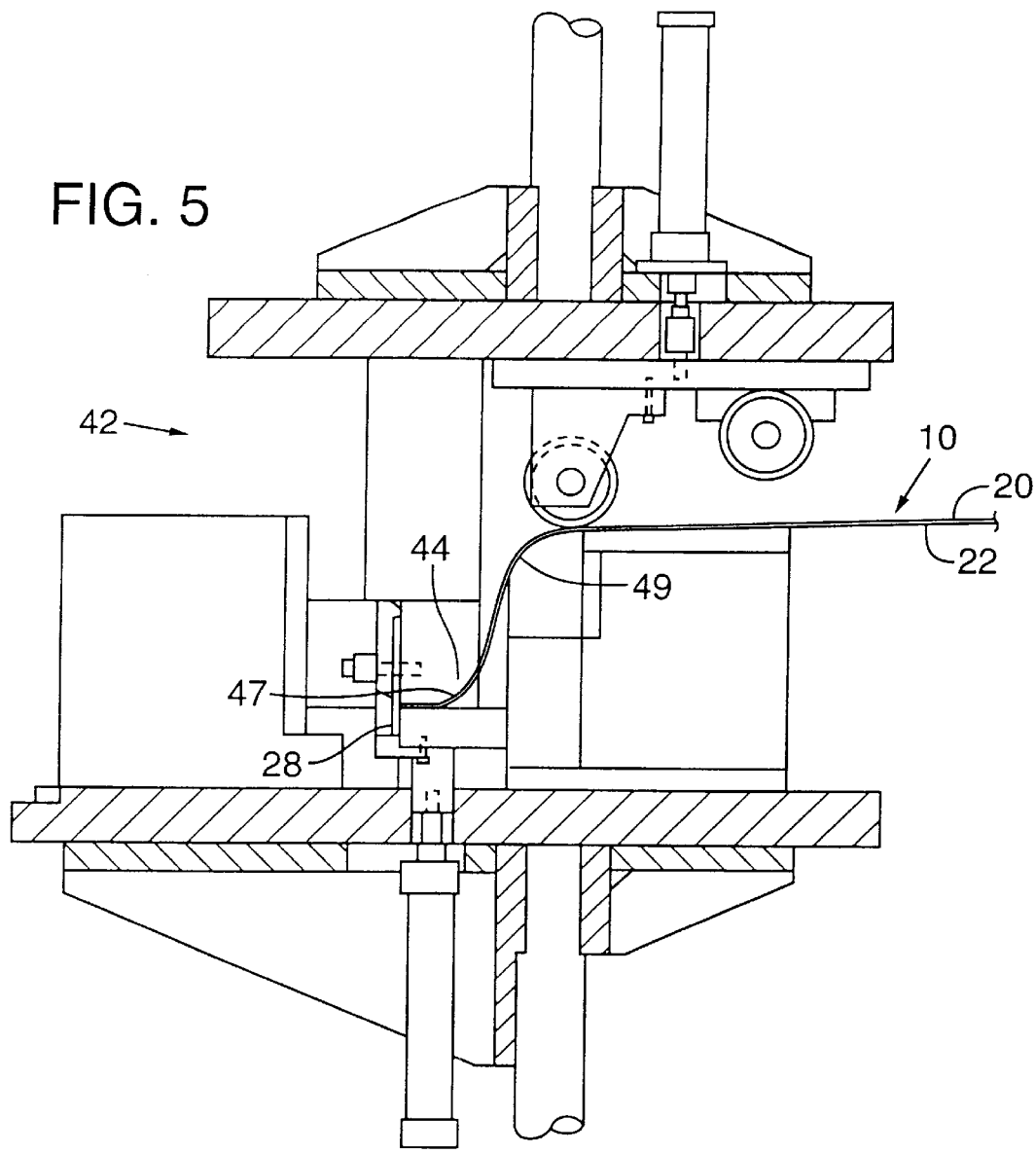

TRUCK CAB SIDEWALL SKIN AND METHOD FOR MAKING THE SAME

FIELD OF THE INVENTION

The present invention relates to a vehicle sidewall exterior skin, and more particularly to a truck cab sidewall skin and a process for making the same.

BACKGROUND OF THE INVENTION

The process of assembling a vehicle involves numerous components and assembly sequences. For instance, many truck cab sidewalls are comprised of a number of pieces of sheet metal attached together. Obviously, this requires separate manufacture processes of each piece, which undoubtedly increases the overall time and complexity of manufacturing the truck cab. In addition, a truck cab sidewall skin is typically riveted to an underlying structure in order to retain it in place. Obviously, a great number of rivets must be used and individually installed in order to secure the sidewall. Furthermore, there are many problems normally associated with riveting sidewalls or sheet metal to a truck cab structure. In particular, leaks may develop through the rivet holes thereby allowing water to penetrate the interior of the truck cab and damage interior components or the sidewall itself.

Therefore, a need exists for a process and truck cab sidewall skin directed toward overcoming the above-described and other problems typically associated with assembling a truck cab.

SUMMARY OF THE INVENTION

Accordingly, it is an object of the present invention to provide a vehicle skin manufacturing process and truck cab skin which is easier and less costly to assemble into a truck sidewall.

The sidewall skin has top, bottom, front, and rear edges. The skin has a first exterior surface and a second interior surface opposing the first exterior surface. The sidewall skin preferably has a front flange formed along the front edge. The front flange preferably projects in a first or inward direction (in a direction toward the interior of the cab). The front flange is sized and positioned for attachment to a door frame so that the sidewall skin may readily and securely be fastened to the underlying truck cab structure. The sidewall skin also preferably has a flange along the top edge which also most preferably is inwardly directed. The top flange may be utilized in attaching the sidewall skin to the underlying structure of the truck cab. A rear corner is preferably included in the sidewall skin and is formed in the sheet metal at a location spaced inwardly from the rear edge of the sheet. The portion of the sidewall between the rear edge and the corner comprises a portion of the exterior surface of a rear wall of the truck cab. The rear corner is preferably formed by a roll forming technique, as discussed herein in more detail.

The sidewall skin also most preferably has a transition region spaced rearwardly of the front flange and forwardly of the rear corner. The transition region is stepped inwardly, or more particularly, in an illustrated form, is generally of an S-shaped cross section. The transition region is preferably formed by a die-press, as also discussed herein in more detail.

The present invention is directed toward the above objects, features and advantages individually as well as collectively. These and other objects, advantages, and features will become more apparent with reference to the following description and Figures.

BRIEF DESCRIPTION OF THE DRAWINGS

FIG. 5 is a die-press machine which may be used to form the transition region of the sidewall of FIG. 1 in a single pressing step.

DETAILED DESCRIPTION OF PREFERRED EMBODIMENTS

SIDEWALL SKIN FORMATION

Figure 1:
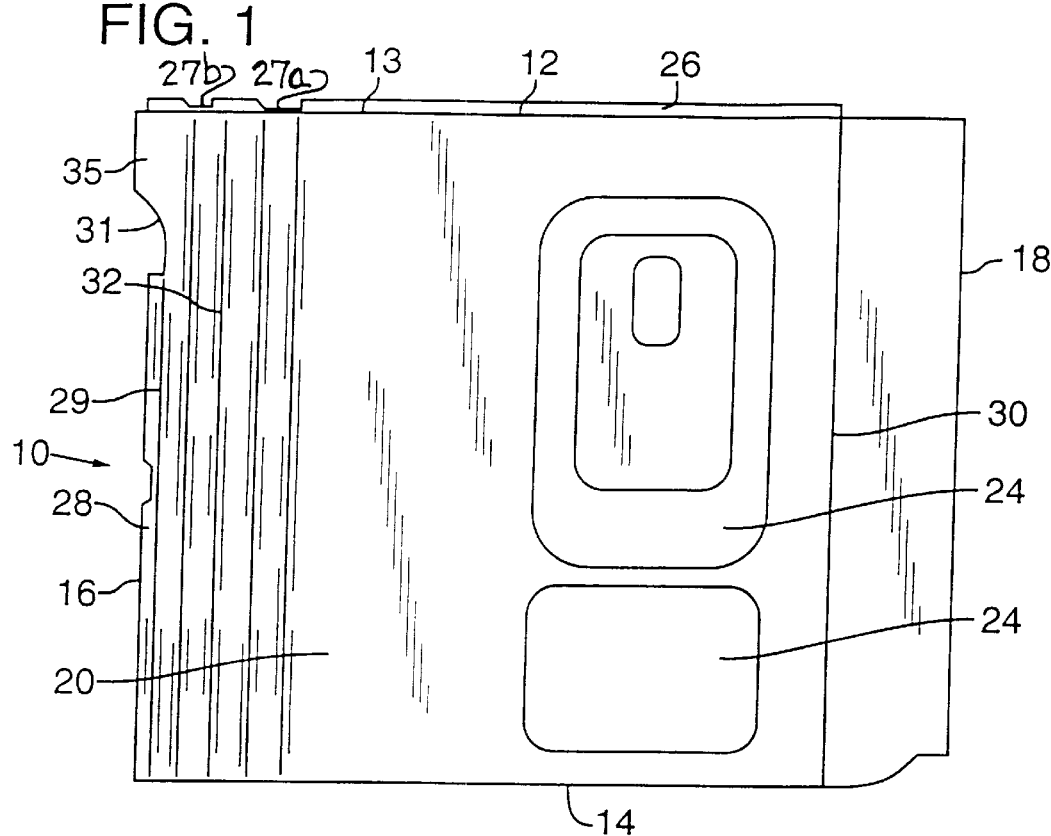
FIG. 1 is a side view of a blank used in the manufacture of one embodiment of the sidewall of the present invention.

FIGS. 1 through 5 show a sidewall skin 10 of one form of the present invention and a method for making this form of sidewall skin in accordance with the present invention. Referring to FIG. 1, a blank for forming the sidewall skin 10 is shown. The sheet is preferably of metal and has a top edge 12, bottom edge 14, and front and rear edges 16, 18. The sheet also has a first exterior side surface 20 and a second interior side surface 22 (FIG. 4) opposite the first exterior side surface. Optional openings 24 may be formed or cut out of the blank to provide access through the sidewall and into storage spaces or compartments to be located within the truck cab. In other words, openings can be selectively cut in the sheet material blank between the major opposed surfaces to provide access to the cab's storage compartments or for other purposes.

Figure 2:
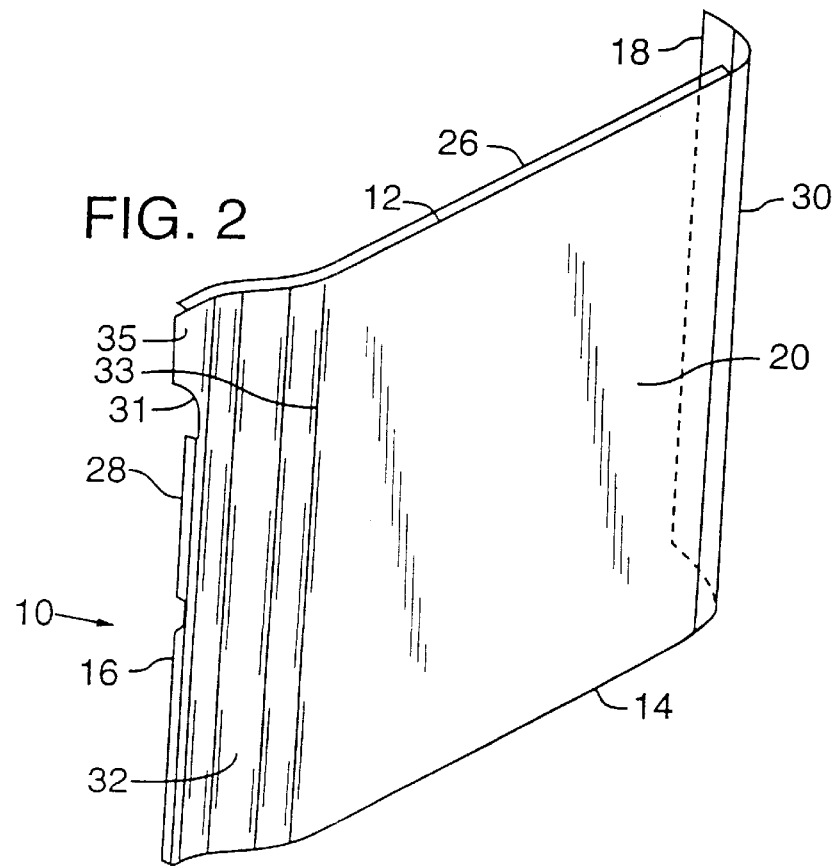
FIG. 2 is a perspective view of one embodiment of the sidewall of the present invention.

As shown in FIGS. 1 and 2, in particular, an inwardly directed flange 26 is formed along a fold line 13 at the top edge 12 of the sidewall skin 10. The fold line 13 as well as line 29 and other fold lines on the blank are imaginary and are simply shown for purposes of illustrating locations where the sidewall is bent. As will be discussed in more detail below, and as shown in the figures, the top flange 26 may be provided in one form of the invention and utilized, for example, in attaching the sidewall to an underlying frame structure of the truck cab. In the illustrated embodiment, the top flange 26 terminates at location 25 which is forwardly of the corner 30 (see FIG. 2). In addition, the top flange 26 (see FIG. 1) in the illustrated embodiment has at least one cutout or removed region and, in the specific form shown, has two spaced-apart cutouts or removed regions 27*a* and 27*b* located at the transition region of the sidewall skin. As also shown in FIGS. 1 and 2, a front flange 28 may be formed along a fold line 29 adjacent to the front edge 16 of the sheet metal. The front flange 28 projects in a first or inward direction, in this case in a direction towards the interior of the cab when the sidewall skin is incorporated into the cab. The front flange 28 is preferably upright or vertically oriented, sized and positioned for attachment to a door frame so that the front edge of the sidewall skin can be rigidly and securely fastened to the underlying framework of the truck cab. The blank has an upwardly and forwardly extending arcuate edge 31 above the line 29. As a result, a skin flap 35 is available for mounting to the door frame above the door.

As shown in FIG. 2, a rear corner 30 may be formed at a location of the blank inwardly from the rear edge 18. The portion of the sidewall skin between the rear 18 edge and the rear corner 30 comprises a portion of a rear wall of the assembled truck cab. Also, a portion of the sidewall skin between the front flange 28 and the rear corner 30 may comprise a transition region 32 of the sidewall of the truck cab. More specifically, in the illustrated form, the transition region 32 commences at a location just rearwardly of the line 29, and terminates at a location 33, which is typically no more than about one-fifth of the overall width of the sidewall skin. The transition region is optional and is preferably included in trucks of a design which have a wider rear sleeper cab portion than the front portion of the cab.

Figure 3:
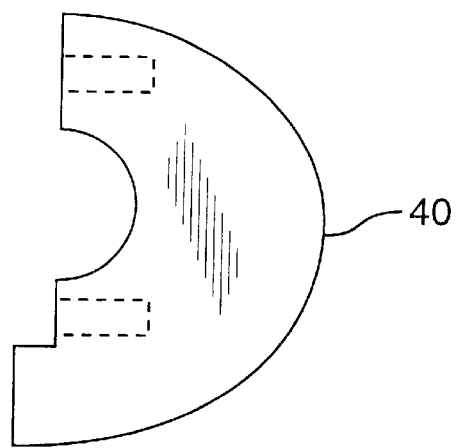
FIG. 3 is a side view of an arbor for a roll forming machine which may be used to form a rear corner in the sidewall of FIG. 1.
Figure 4:
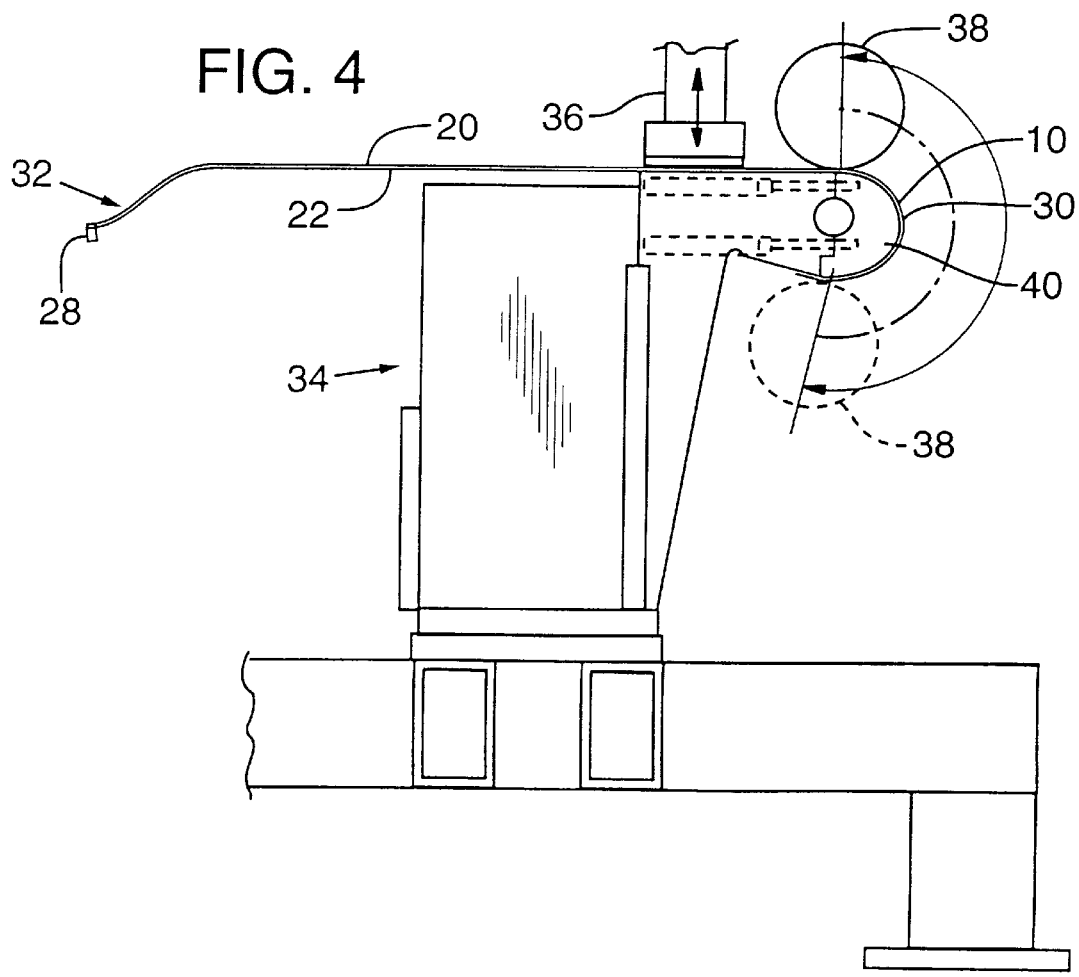
FIG. 4 is a side view of a roll forming machine used to form the sidewall of FIG. 1.

Although it may be formed in other ways, as shown in FIG. 4, the rear corner 30 is preferably formed by a roll forming technique. The sidewall 10 is placed substantially horizontally on a roll forming machine 34. A press 36 is used to retain the blank on the roll forming machine 34 in order to prevent it from moving while forming the rear corner 30. A roller form bar 38 is used to form the rear corner 30 in the blank. To form a 90 degree corner, the blank is bent to a greater extent than 90 degrees to accommodate spring-back. For example, for an aluminum blank of 50 mil aluminum, and as shown in FIG. 4, the roller form bar 38 rolls along an essentially 170 degree rotational path. Thus, not only does the roller form bar 38 rotate along its axis, it also follows a rotational path in order to form the rear corner 30 of the sheet metal 10. By following a 170 degree rotational path, a 90 degree corner 30 is essentially formed in the sidewall. In other words, although the sheet metal is bent more than 90 degrees as the roller bar 38 travels along a 170 degree path, the sheet metal springs back to form a 90 degree corner. FIG. 3 shows a side view of a form of arbor 40 used to form the rear corner of the sheet metal. More specifically, the roller bar 38 rolls along the path formed by the exterior surface of the arbor 40. As shown in FIG. 4, the sidewall is held between the roller bar 38 and arbor 40 during the process of forming the corner.

Again, as shown in FIG. 2, a transition region 32 is preferably formed in the sheet metal. The transition region 32 is spaced rearwardly of the front flange 28 and forwardly of the rear corner 30 of the sheet metal 10. The transition region is stepped inwardly (moving from back to front along the sidewall) with respect to a plane containing a major portion of the exterior surface 20 of the sheet material. In other words, the transition region 32 is stepped inwardly toward the interior of the truck cab. The transition region preferably extends vertically between the top 12 and bottom 14 edges of the sheet metal or skin.

Although other techniques may be employed, the transition region is preferably formed in a single step utilizing a die-press 42 (FIG. 5). Thus, both bends which make up the transition region are formed simultaneously in a common manufacturing step by the die-press 42. The die-press includes a die 44, 45 with curved surfaces 47, 49 which form the inwardly stepped transition region 32 when pressed against the sheet metal 10 as shown in FIG. 5. As shown in FIG. 2, the illustrated transition region is generally of an "S-shaped" cross-section. As shown in FIGS. 4 and 5, during formation of the transition region, the skin 10 is typically supported in a horizontal orientation during the forming steps, with the interior surface 22 positioned below the exterior surface 20, and the interior surface supported from below.

Preferably, when constructing the sidewall 10 the front flange 28 is first formed along the front edge 16 of the sheet. Consequently, the front flange 28 may be gripped by die-press 42 when the transition region 32 is formed. The transition region 32 is then formed using the die-press 42. The top flange 26 is then formed along the top edge 12 of the sheet and the rear corner 30 is then formed. However, if openings 24 are provided through the sheet, as discussed above, they are preferably cut before forming the flanges, transition region, and rear corner. Typically, multiple sheets are stacked and the openings are simultaneously cut in the sheets, such as by using an NC router.

During each of the skin formation steps, the blank may be supported on interior side 22. Consequently, possible marring and scratching of the exterior surface 20 is minimized.

It should be appreciated that the skin can be formed in alternative ways without departing from the present invention.

TRUCK DOOR FRAME

Figure 6A:
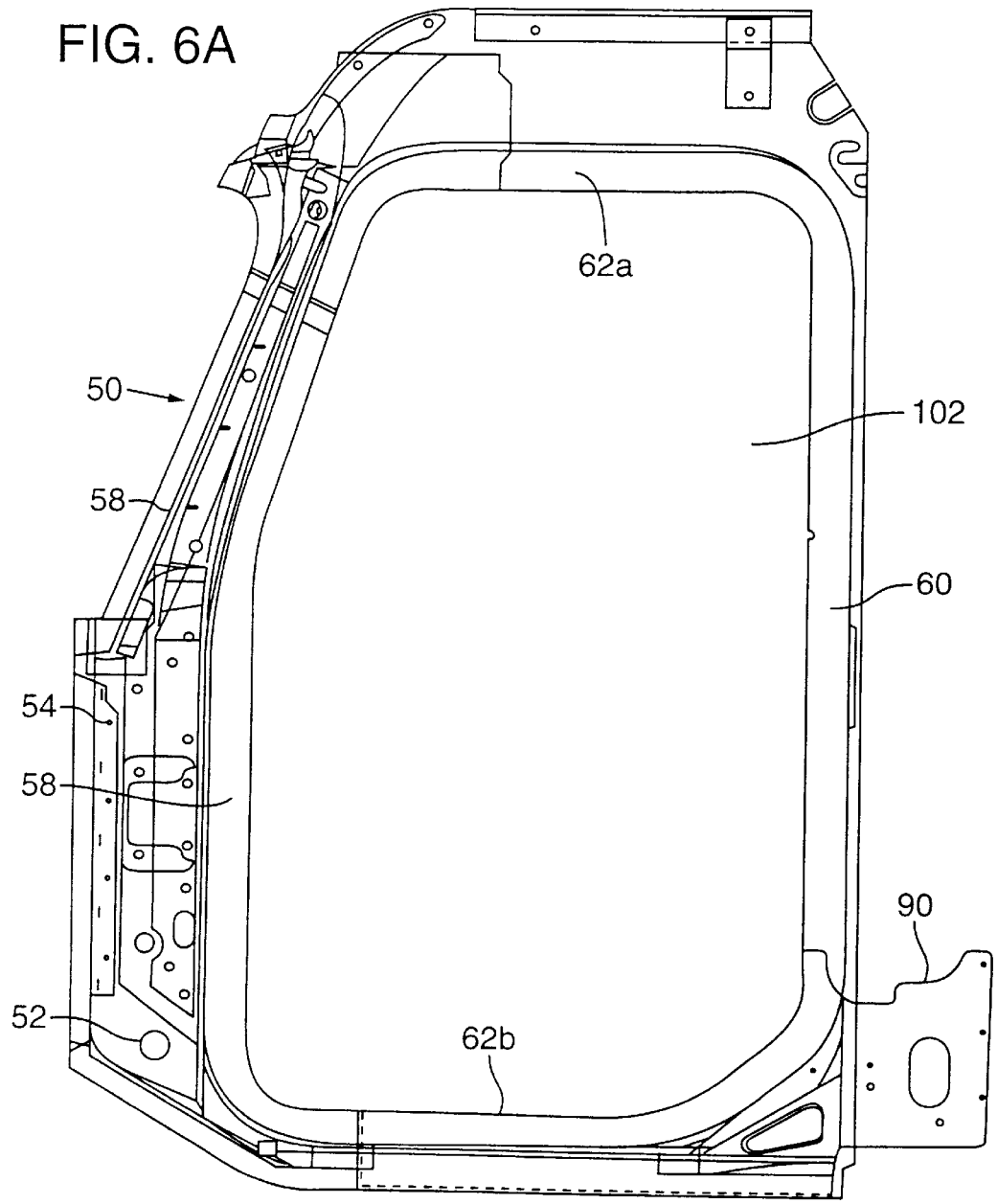
FIG. 6A is a side view of one embodiment of a door frame which may be used in combination with the sidewall skin of the present invention in a truck sidewall assembly.
Figure 6B:
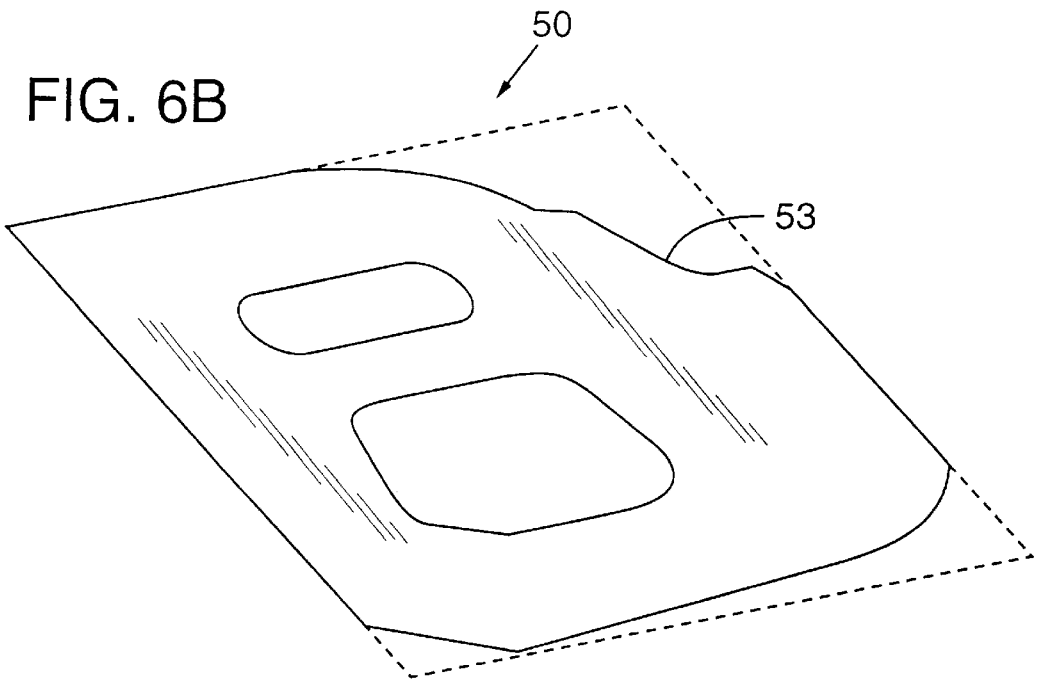
FIGS. 6B–6F illustrate one exemplary sequence of forming the door frame of FIG. 6A from a monolithic piece of sheet metal.
Figure 6C:
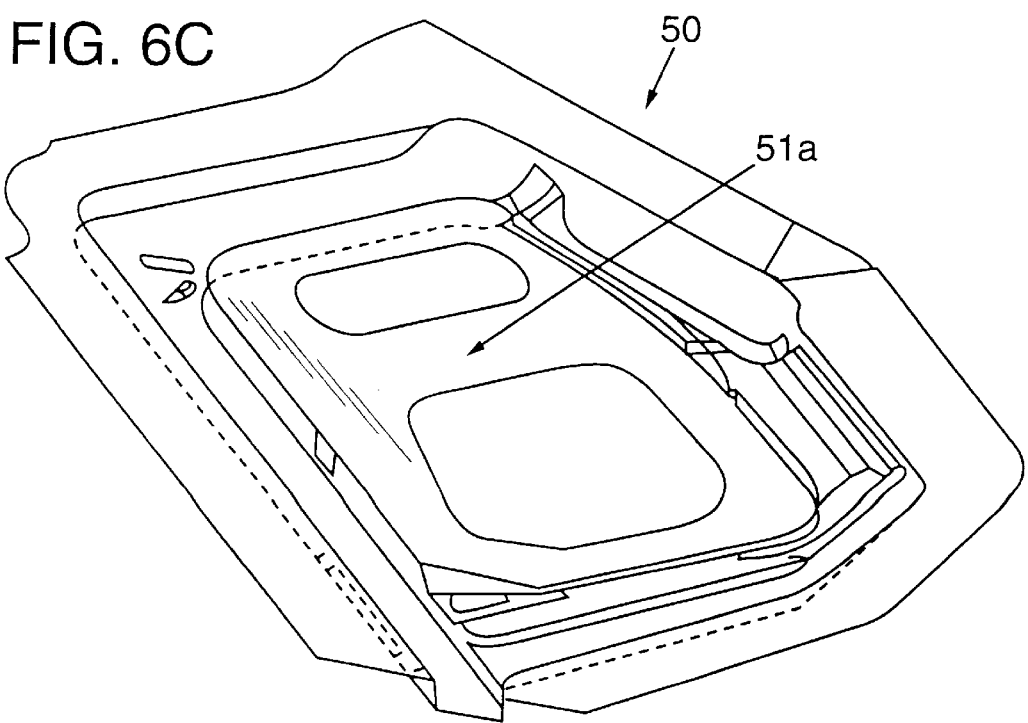
Figure 6D:
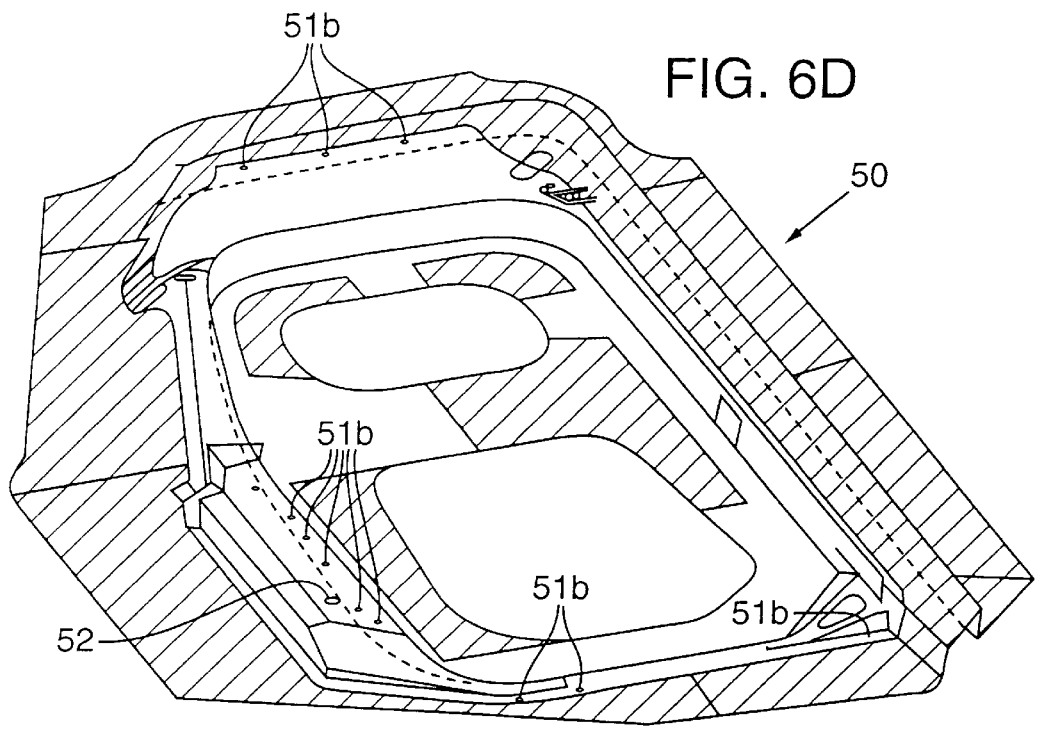

In further accordance with the present invention, the front flange 28 of the skin may be affixed to the rear upright element of a door frame. The door frame may take any convenient form, including prior art forms. However, one suitable door frame assembly 50 is shown in FIG. 6A. This particular door frame is structurally strong and rigid. FIGS. 6B–6F show an exemplary sequence for forming the door frame of FIG. 6A from a monolithic sheet or blank, such as of metal. The door frame may be formed using a double-action toggle press with die cushion in bed. The sheet metal blank is first pre-drawn and cut along boundary 53 to take the form shown in FIG. 6B. The sheet is then drawn or die-pressed and cut as shown in FIG. 6C. A nitro pad is placed in the area indicated by arrow 51*a*. As illustrated in FIG. 6D, the blank is restruck and trimmed (with the cross-hatched areas removed) and then pierced with holes where indicated by arrows 51*b*. Hole 52 is a pilot or gauge hole which may be used as a reference when assembling the truck cab.

Figure 6E:
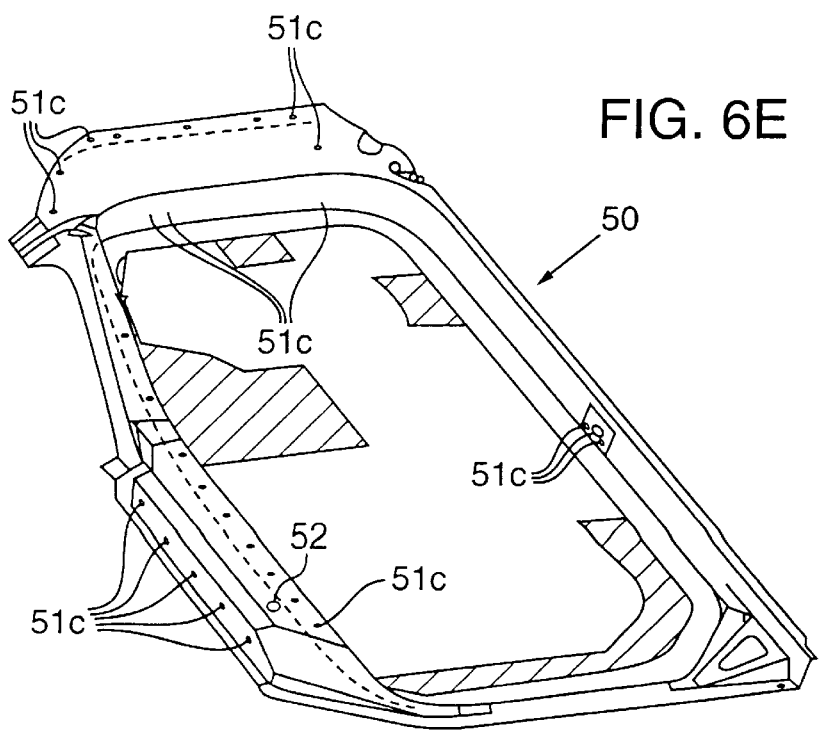
Figure 6F:
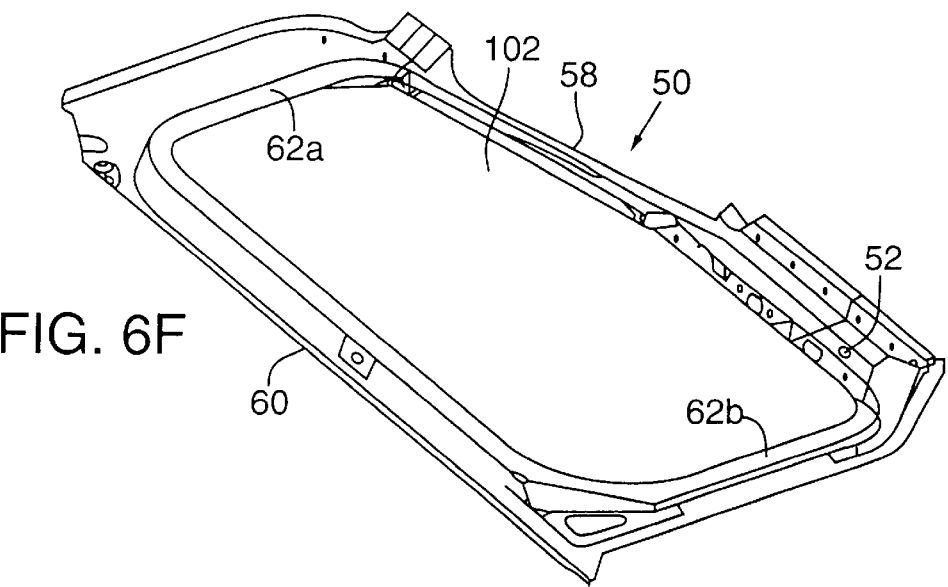

FIG. 6E illustrates, by arrows 51*c*, locations where holes are cam punched, and identifies further trim (see the cross-hatched areas) and restrike areas. Finally, FIG. 6F shows the illustrated door frame following these steps.

Although not necessary for this invention, the door frame 50 is preferably stamped or formed from a single or monolithic piece of sheet metal. By doing so, numerous pieces typically used to comprise a truck cab door frame are eliminated. Further, the illustrated door frame is preferably constructed to enclose or bound the entire perimeter of a door opening. As a result, the door frame is strong and is also relatively easy to install.

The blank used to make the door frame is preferably sheet metal with an aluminum 5052 alloy commercially available from Alcoa Aluminum Co. being a specifically preferred material. The sheet metal is preferably 50 mil thick. Again, the door frame 50 most preferably has a pilot or gauge hole 52 for use in positioning the frame and aligning components relative to the gauge hole during cab assembly. For example, a protruding alignment pin from a jig or positioner (not shown) can be inserted through the pilot hole 52 for retaining or holding the door frame, and for serving as a reference point to properly align the door frame and door (as well as sidewall) during the manufacturing process.

As shown in FIG. 6A, the door frame typically has a number of fastener receiving holes for attachment of other related truck cab components. For instance, the door frame may have a plurality of holes for attachment of a firewall-dashboard assembly to the truck cab assembly. The door frame may also have a plurality of holes 54 for receiving fasteners to attach a door to the frame by the use of a hinge.

The illustrated door frame 50 (see FIGS. 6A, 6F and 6G) has essentially two upright support elements, namely, a front upright support element 58 and a rear upright support element 60. The element 58 forms an outboard portion of an A-pillar or upright frame component forwardly of the door of the truck. A substantially horizontal frame support element 62a interconnects or extends between upper ends of the front upright support element 58 and the rear upright element 60. The upper surface 64 (FIG. 6G and FIG. 8) of the upper horizontal frame element contains a plurality of holes 66 for attachment of roof related structures to the truck cab. It should be understood, however, that the roof of the truck cab is not part of the present invention described herein, and that the truck cab roof can vary in design and structure and still be suitable for use with the present invention. A substantially horizontal support element 62b also interconnects or extends between the lower ends of the upright support elements 58, 60.

Figure 6G:
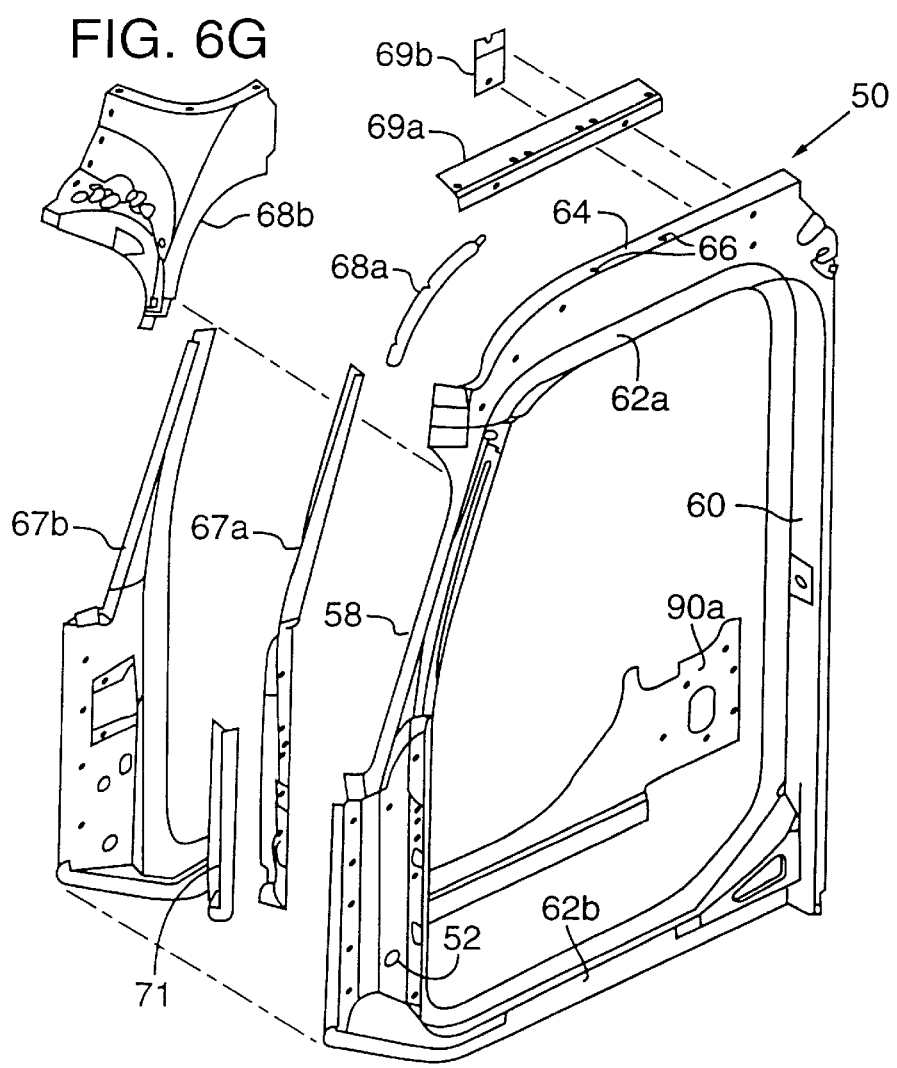
FIG. 6G is an exploded perspective view of a door frame assembly in which the door frame of FIG. 6A is shown together with additional components which may be attached thereto.

As shown in FIG. 6G, components may be added to the door frame to form a door frame assembly. For example, an internal A-pillar reinforcement support 67a can be mounted to the front upright support element 58. An inboard A-pillar section 67b may also be mounted to the front upright support element 58. B-pillar bridging or reinforcing plates 90a, 90b (see FIG. 9) may also be mounted to the door frame. These reinforcing plates assist in rigidly connecting the door frame to rearward components of the truck sidewall. A sunvisor mounting bracket 68a may also be mounted to the upper horizontal interconnecting support element 62a of the door frame. A forward roof cross-piece section 68b may, in addition, be mounted to the door frame along with roof coupling elements 69a, 69b. A door reinforcing bracket 71 may be mounted to the A-pillar forming components to back up a door hinge coupled to the door frame. The door frame assembly may, of course, be of a different construction and be comprised of different elements without affecting the present invention.

SIDEWALL ASSEMBLY

Figure 7:
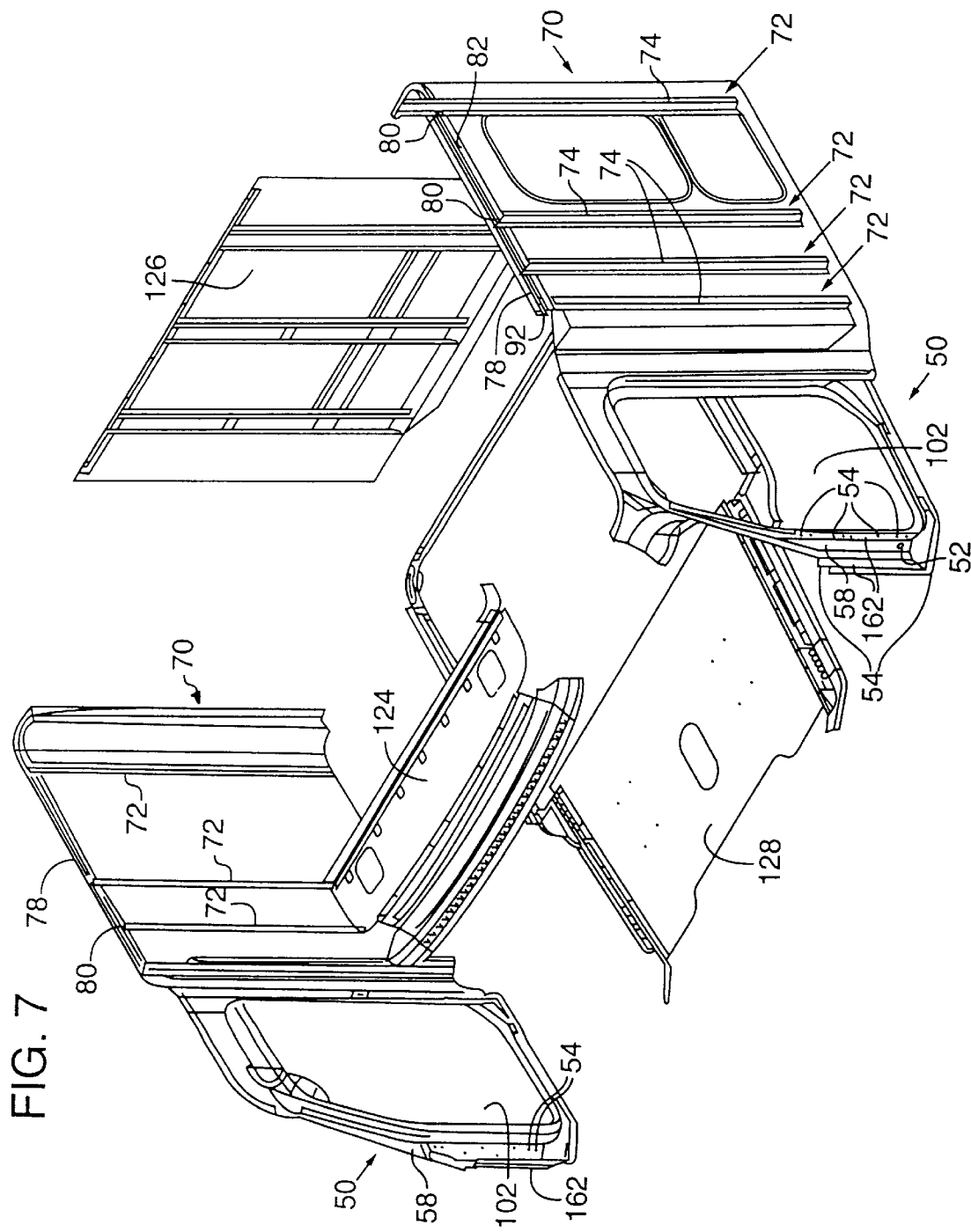
FIG. 7 is an exploded perspective view of a truck cab assembly with sidewall skins of one form of the present invention (the skin at the driver's side of the truck being depicted as if it were transparent to show a sidewall frame underneath the skin).
Figure 8:
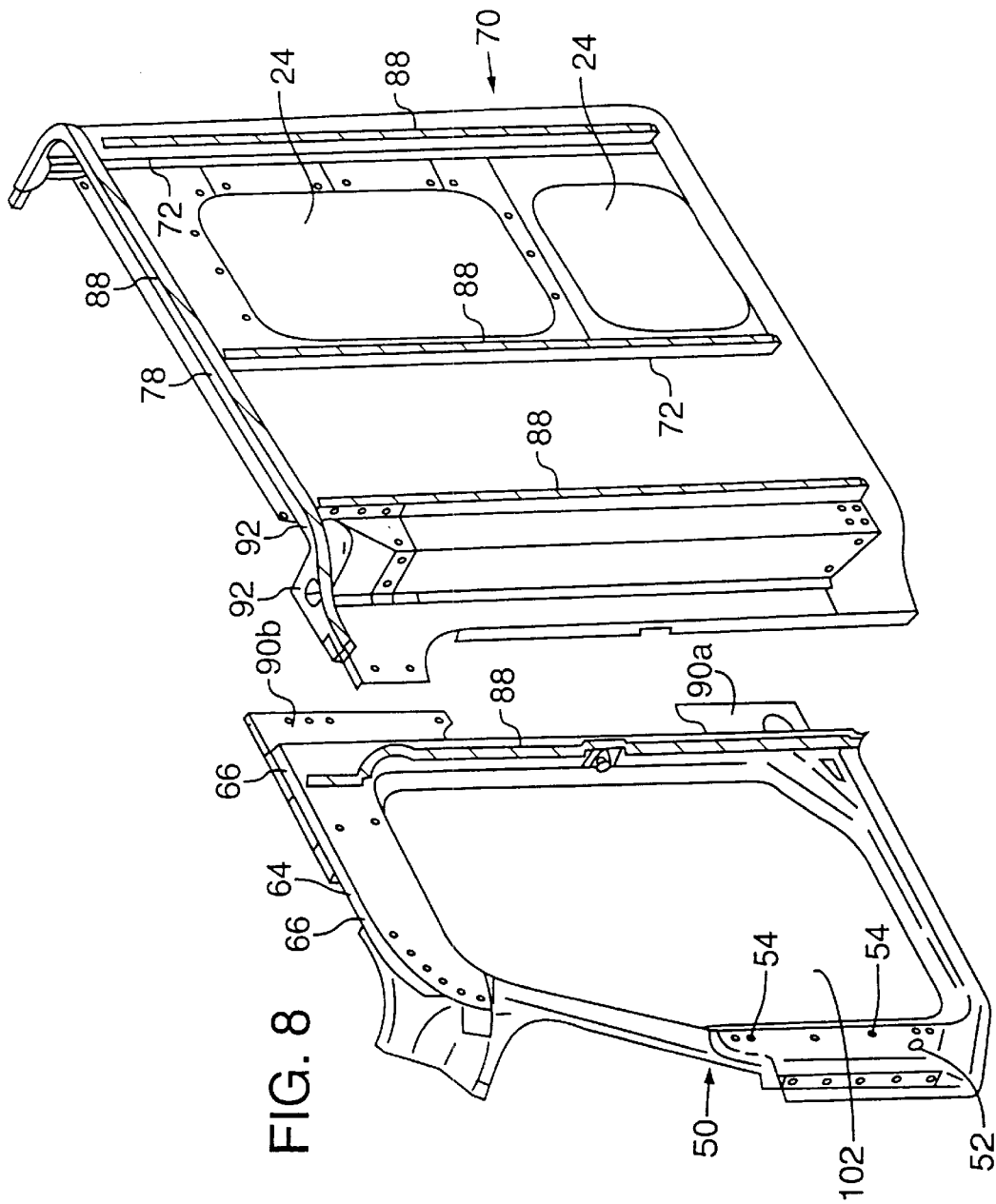
FIG. 8 is a side elevational view of an exemplary underlying frame structure (including the door frame) to which a sidewall skin of the present invention (shown in the same manner as in FIG. 7) may be mounted, for example by adhesives, when used in a truck sidewall.
Figure 9:
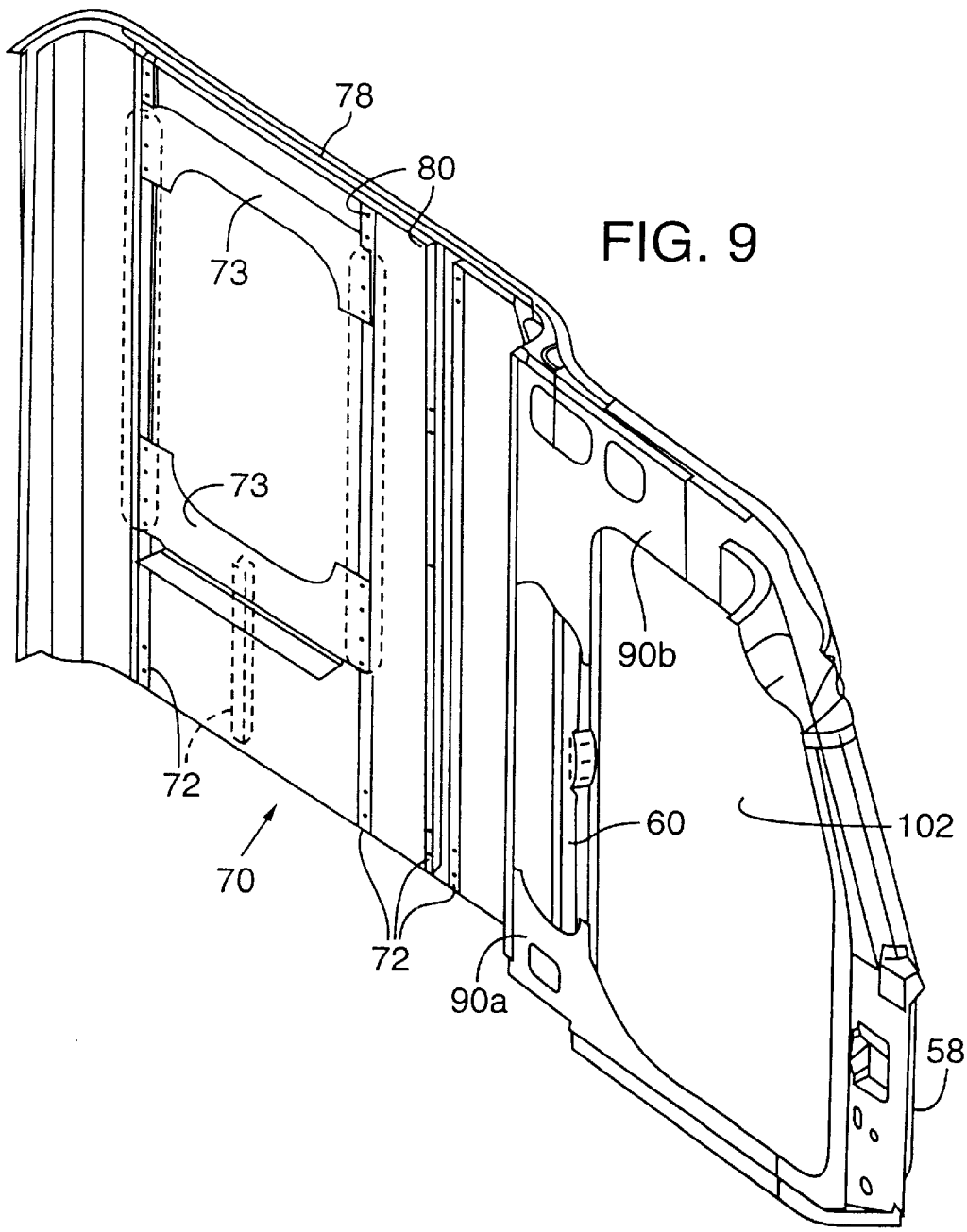
FIG. 9 is an interior perspective view of the interior side of the assembled truck sidewall of FIG. 8.
Figure 10:
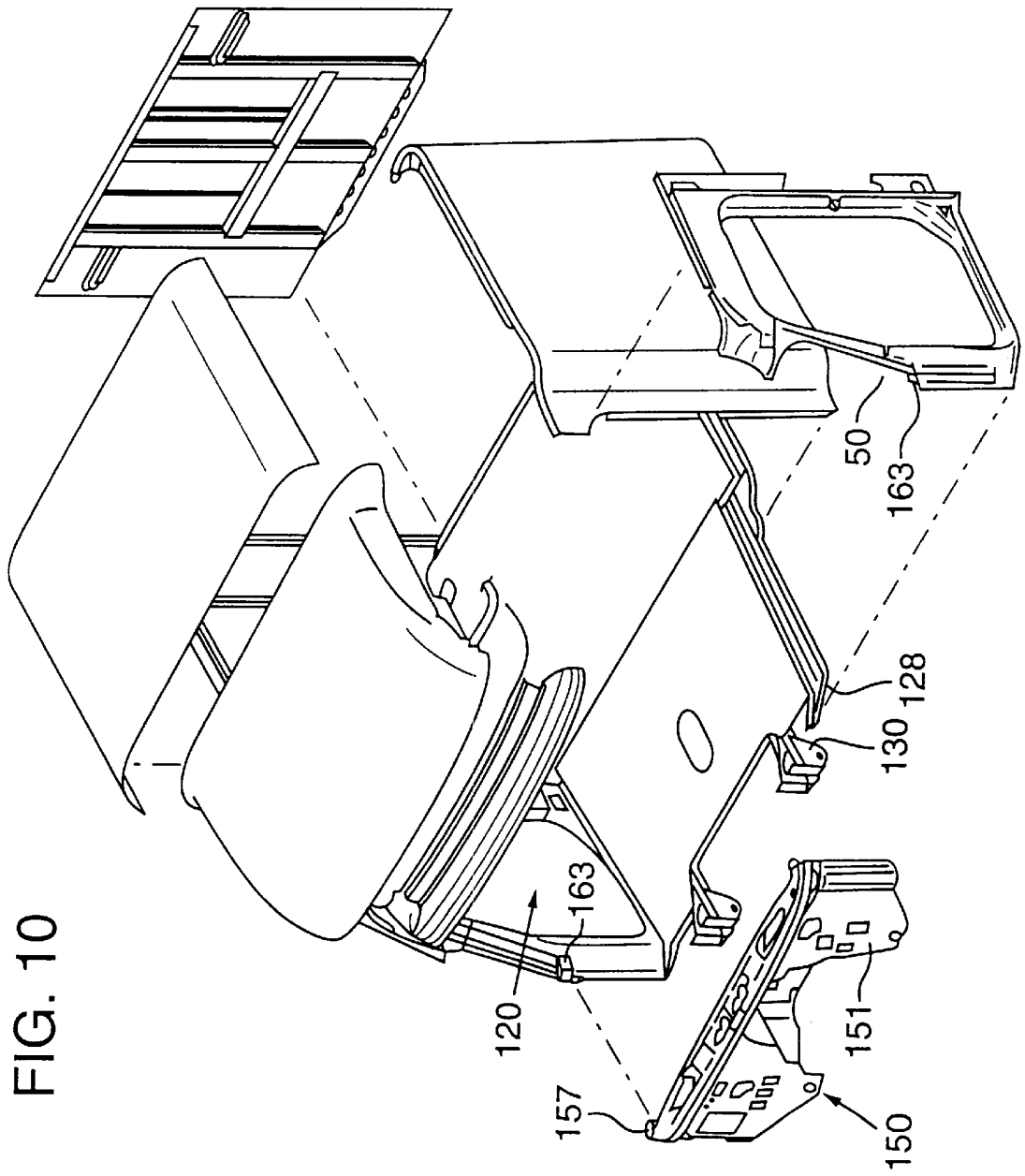
FIG. 10 is an exploded perspective view of a truck cab including sidewall skins of one form of the present invention.

The sidewall underlying frame assembly 70 is best shown in FIGS. 7–9. As illustrated, the sidewall frame assembly preferably has a number of upright or vertical frame elements or studs 72 and opening bridging cross-pieces 73. The frame elements 72 have a first exterior surface 74 and a second interior surface opposite the first exterior surface. These frame elements may be of any suitable material, with aluminum (80 mil thick) being a specific exemplary material. The door frame 50 is fastened to the sidewall frame assembly 70 (see, for example, FIG. 9) to complete the underlying framework for the side of the truck cab. The illustrated sidewall frame assembly 70 has an upper elongated horizontally extending reinforcing element 78 (FIG. 7) interconnecting upper ends 80 of the upright frame elements 72. The upper reinforcing element 78 has a first exterior surface 82 (FIG. 7) and a second interior surface opposite the first exterior surface. The pilot hole or gauge hole 52 in the door frame enables the frame assembly 70 to be aligned during the manufacturing process by inserting alignment elements or pins through the gauge hole when the sidewall skin is mounted to the frame. The upright frame elements 72 preferably extend substantially from the floor 128 to the roof structure 124 of the cab body. That is, the upright frame elements extend substantially to the top edge 12 of the sidewall 10 where the edge of the roof structure (not shown) joins the sidewall. The underlying frame is also attached to the door frame 50. As previously mentioned, the door frame assembly may have reinforcing plates 90a, 90b connected thereto. The sidewall frame 70 is coupled to the reinforcing plates 90a, 90b (see FIGS. 8 and 9).

The sidewall 10 is attached to the exterior surfaces 74, 82 of the frame elements 72, 78, and also to the frame element 60. Although rivets or other fasteners may be used, most preferably, adhesives are used to minimize the need to penetrate the sidewall with fasteners. Thus, in a preferred approach, adhesive is applied to the exterior surfaces 74, 82 of these frame elements (as illustrated by heavy black lines 88 in FIG. 8). Before applying the adhesive, the exterior surfaces 74, 82 of the upright frame elements 72, 78 are preferably wiped clean and scuffed to provide better contact with the adhesive, thereby forming a stronger bond between the sidewall 10 and the upright frame elements. One preferred adhesive is Betamate 73312/73313, a two-part adhesive available from Essex Speciality Product of Auburn Hills, Mich.

In one manufacturing approach, following the application of the adhesive, the front flange 28 of the sidewall skin 10 is attached to the rear upright frame element 60 of the door frame, such as by using fasteners (such as rivets or bolts) extending through the flange and door frame. The rear edge 18 of the sidewall skin 10 is then pulled (in a direction towards the back of the cab or away from the door) to apply tension to the skin as it is positioned on the frame. For example, thirty to forty ft.-lbs. tension is applied to the skin. The tensioned sidewall skin is pressed or pulled against the adhesive on the exterior surfaces of the frame elements 72, 78 in order to secure the sidewall skin to the underlying frame assembly 70. More specifically, tension is applied along the sidewall skin in a front to rear direction to position it against the underlying frame. The skin thus adheres to the elements 72, 78 with the top edge 12 of the sidewall skin being positioned against the adhesive on the exterior surface of the upper reinforcing element 78. Clamps are preferably used to hold the skin against the adhesive. Although typically unnecessary, the top flange 26 of the sidewall skin may be mechanically fastened to the top surface 92 of the reinforcing element 78 by the use of fasteners or the like. Rather than totally eliminate such top edge fasteners, several spaced apart fasteners (e.g. 3 or 4), such as counter sunk screws, are preferably used along the top flange 26 along the transition region 32, a location of higher stresses, if the cab design includes such a region. It should, therefore, be appreciated that the sidewall is secured to the underlying frame assembly preferably without fasteners extending through the exterior side surfaces of the sidewall skin and into the frame elements. Thus, the surfaces of the sidewall skin, at least spaced from the edges of the sidewall, may be fastener free. It should be noted that during cab assembly, fasteners are commonly used along the bottom edges of the sidewall and at the rear of the truck.

The adhesive is then allowed to cure or is actively cured, for example by the application of heat. The edges of the sidewall skin are preferably clamped during the curing process to retain the sidewall in place. The clamps are removed after the curing process. Preferably, clamps are applied to the sidewall skin along the top edge of the frame and the sidewall is supported in a carrier during initial curing.

Once the sidewall skin 10 is adhesively (and mechanically, if some fasteners are used) secured to the sidewall frame assembly 70, the adhesive is most preferably actively cured. A single cure step may be used with the adhesive substantially totally cured during this step. For example, a fast curing adhesive may be used or a long cure time may be used under ambient conditions. Alternatively, heat may be applied to accelerate curing in a single curing step. However, a two-step heat curing process is preferred. In a first step, heat is applied to cure the adhesive sufficiently for handling purposes ("green" strength). The second step takes advantage of the fact that truck finishes, such as paint, are typically baked or heat cured. The second adhesive curing step is typically delayed until the paint baking step where it simultaneously is accomplished during paint curing. As a result, less additional energy is used to cure the adhesive. The curing process thus preferably comprises first and second heat curing steps. The first heat curing step again results in a partial curing of the adhesive, and the second curing step substantially completes the curing of the adhesive. The first heat curing step preferably occurs prior to the attachment of the sidewall structure to the other structures of the truck cab. The second curing step preferably occurs following the attachment of the sidewall structure to the remaining portions of the truck cab, such as after the truck cab is assembled. Most preferably, the second heat curing step preferably occurs simultaneously with a paint curing step after application of paint to the truck cab. The first or partial curing step gives the sidewall assembly "green" strength for handling during subsequent processing.

More specifically, during the first curing step, the sidewall assembly is pre-baked in order to partially cure the adhesive so that the assembly is sufficiently strengthened in order to be handled during the truck cab assembly process. Most specifically, the first curing step preferably involves heating the sidewall and frame to a temperature which is sufficiently high to accelerate initial adhesive curing to provide adequate sidewall handling strength within approximately one hour and sufficiently low so as to minimize thermal expansion mismatch between the frame and skin to thereby result in a substantially distortion-free exterior sidewall appearance when the sidewall is at or near ambient temperature. The first curing step produces a sidewall assembly (skin and frame) with structural handling strength without visible distortion of the skin exterior surface. By structural handling strength, it is meant that the sidewall assembly can be lifted, moved and installed on a chassis without the skin delaminating from the frame under typical manufacturing conditions. Preferably, although variable depending upon factors such as the type of adhesive being used, during the first curing step the sidewall assembly is heated at from about 120° F. to about 125° F. for a time of from about 75 minutes to about 80 minutes. In one specifically preferred approach, the initial cure step is accomplished by raising the temperature in an oven to 120° F. and holding the temperature at this magnitude for 75 minutes. During the second curing step, or paint curing step, the sidewall assembly is baked or heated for a time and at a temperature to substantially complete the curing of the adhesive for long-term (e.g. for the expected life of the truck) sidewall assembly durability. As a specific example, this second heat cure step may be a multiple stage process. For example, the sidewall (and cab assembly) may first be heated in an oven to 250° F. and held at this temperature for 15 minutes, then reduced to a temperature of 180° F. for 30 minutes, and then heated to 2000° F. for 30 minutes.

The adhesive is preferably applied to the frame elements to eliminate "run out" (adhesive forming beads or running out beyond the edges of the frame elements) which could cause visible lines to be present at the exterior of the sidewall due to contraction or expansion of the sidewall during the final curing of the adhesive. Applying a single bead of adhesive to the center of the exterior surface of each frame element to be glued has proven effective. A robotic adhesive applicator, such as a three axis programmable applicator capable of moving along x, y and z axes (work envelope: x axis—75 inches, y axis—64 inches, z axis—10 inches) from Hi-Star, Inc. of Waterford, Mich. may be used to scuff the exterior frame element surfaces and to accurately apply the adhesive to the frame elements so as to eliminate undesirable "runout".

It should further be appreciated that the sidewall frame assembly can be formed and configured in alternative ways. For instance, the frame support may have horizontal supports in lieu of or in addition to vertical supports to which the sidewall skin is adhered.

Having illustrated and described the principles of the invention in preferred embodiments, it should be apparent to those skilled in the art that the embodiment can be modified in arrangement and detail without departing from such principles. This description illustrates certain embodiments of the present invention and should not be construed to limit the scope of the invention in any way. Other modifications and variations may be made without departing from the invention as defined by the appended claims and their equivalents.

We claim:

1. A sidewall skin for a truck comprising:
    a sheet having exterior and interior major opposed surfaces, front and rear edge portions and top and bottom edge portions;
    the sheet having a corner spaced from the rear edge portion, the portion of the sheet between the corner and rear edge portion providing a rear wall portion for the truck; and
    the sheet having an inwardly projecting front flange at the front edge portion, and wherein the front flange extends only partially along the height of the sheet and terminates prior to the top edge portion.

2. A sidewall skin for a truck according to claim 1 having an inwardly stepped transition region between the front edge portion and the rear corner, and wherein the front edge portion includes an upwardly and forwardly extending arcuate edge positioned above the front flange.

3. A sidewall skin according to claim 1 in which the rearwall portion of the sheet between the rear corner and the rear edge is planar.

4. A sidewall skin according to claim 1 in which the front edge portion has inwardly projecting front flange which terminates at a location spaced below the top edge portion and wherein the front edge portion has a forwardly extending skin flap portion above the front flange.

5. A sidewall skin for a truck comprising:

a sheet having exterior and interior major opposed surfaces, front and rear edge portions and top and bottom edge portions;

the sheet having a corner spaced from the rear edge portion, the portion of the sheet between the corner and rear edge portion providing a rear wall portion for the truck;

the sheet having an inwardly projecting front flange at the front edge portion; and an inwardly directed top flange along at least a portion of the top edge portion of the sheet.

6. A sidewall skin for a truck according to claim 5 having at least one opening through the sheet between the exterior and interior major opposed surfaces.

7. A sidewall skin for a truck according to claim 5 in which the transition region is die formed and the corner is roll formed.

8. A sidewall skin according to claim 5 in which the transition region is generally of an S-shaped cross-section and wherein the top flange is discontinuous at least at one location at the transition region.

9. A sidewall skin for a truck according to claim 5 in which the inwardly directed top flange extends inwardly at substantially a right angle to the interior major opposed surface of the sheet.

10. A sidewall skin for a truck according to claim 9 in which the inwardly projecting front flange extends inwardly at substantially a right angle to the interior major surface at the front edge portion.

11. A sidewall skin for a truck according to claim 5 in which the inwardly directed top flange terminates forwardly of the corner.

12. A sidewall skin for a truck according to claim 11 in which the inwardly directed top flange has at least one removed region at the transition region.

13. A sidewall skin according to claim 12 in which there are at least two spaced-apart removed regions in the top flange located at the transition region.

14. A sidewall skin for a truck comprising:

a sheet having exterior and interior major opposed surfaces, front and rear edge portions and top and bottom edge portions;

the sheet having a corner spaced forwardly of the rear edge portion, the rear edge portion having a rear edge, the portion of the sheet between the rear corner and rear edge providing a rear wall portion for the truck;

the sheet having an inwardly projecting flange at the front edge portion;

an inwardly stepped transition region between the front edge portion and the rear corner;

an inwardly directed top flange along at least a portion of the top edge portion of the sheet; and in which the transition region is generally of an S-shaped cross-section.

15. A sidewall skin according to claim 14 in which the inwardly directed top flange extends inwardly at substantially a right angle to the interior major opposed surface of the sheet and the inwardly projecting front flange extends inwardly at substantially a right angle to the interior major surface at the front edge portion.

16. A sidewall skin according to claim 15 in which the inwardly directed top flange terminates forwardly of the corner and the inwardly directed top flange has at least one removed region at the transition region.

17. A sidewall skin according to claim 14 in which the inwardly directed top flange terminates forwardly of the corner and the inwardly directed top flange has at least one removed region at the transition region.

18. A sidewall skin for a truck comprising:

a sheet having exterior and interior major opposed surfaces, front and rear edge portions with a rear edge and top and bottom edge portions;

the sheet having a corner spaced from the rear edge portion, the portion of the sheet between the corner and rear edge providing a rear wall portion for the truck;

an inwardly stepped transition region between the front edge portion and the rear corner;

an inwardly directed top flange along a portion of the top edge portion of the sheet; and in which the inwardly directed top flange has at least one removed region at the transition region.

19. A sidewall skin according to claim 18 in which the transition region is generally of an S-shaped cross-section.

20. A sidewall skin according to claim 18 in which the transition region is die formed and the corner is roll formed.

21. A sidewall skin for attachment to a vehicle frame, the vehicle frame defining a door opening bounded by front, rear, top and bottom door frame portions, the sidewall skin comprising:

a sheet having exterior and interior major opposed surfaces, front and rear edge portions and top and bottom edge portions, the rear edge portion terminating in a rear edge;

the sheet having a corner spaced from the rear edge, the portion of the sheet between the corner and rear edge providing a rear wall portion for the truck;

the sheet having an inwardly projecting flange at the front edge portion; and wherein the inwardly projecting flange has front and rear facing surfaces and is positioned such that at least a portion of the rear facing surface of the inwardly projecting flange engages the rear door frame portion of the door opening.

22. A sidewall skin according to claim 5 in which the inwardly directed top flange extends from a location adjacent to the corner and forwardly to a location adjacent to the front edge portion.

* * * * *

UNITED STATES PATENT AND TRADEMARK OFFICE
CERTIFICATE OF CORRECTION

PATENT NO.   : 6,120,089
DATED        : September 19, 2000
INVENTOR(S)  : Kalstiantz et al.

It is certified that error appears in the above-identified patent and that said Letters Patent is hereby corrected as shown below:

Column 8,
Line 15, please change "2000° F." to read -- 200° F. --.

Signed and Sealed this

Twenty-fourth Day of June, 2003

JAMES E. ROGAN
*Director of the United States Patent and Trademark Office*